United States Patent [19]

Eschbach et al.

[11] Patent Number: 5,795,233
[45] Date of Patent: Aug. 18, 1998

[54] UNIVERSAL JOINT

[75] Inventors: Markus Eschbach, Overath; Peter Schwärzler, Glattbach; Hans-Heinrich Welschof, Rodenbach, all of Germany

[73] Assignee: Lohr & Bromkamp GmbH, Offenbach am Main, Germany

[21] Appl. No.: 525,222

[22] Filed: Sep. 8, 1995

[30] Foreign Application Priority Data

Sep. 10, 1994 [DE] Germany ............... 44 32 245.3

[51] Int. Cl.[6] ................................. F16D 3/223
[52] U.S. Cl. ................................. 464/143; 464/906
[58] Field of Search ........................... 464/139, 141, 464/143, 147, 906

[56] References Cited

U.S. PATENT DOCUMENTS

| 3,362,192 | 1/1968 | Orain ............... 464/143 X |
| 4,249,395 | 2/1981 | Krude et al. ......... 464/143 |
| 5,376,052 | 12/1994 | Jacob et al. ......... 464/906 X |

FOREIGN PATENT DOCUMENTS

| 2044701 | 4/1972 | Germany. |
| 2316064 | 10/1973 | Germany. |
| 2527376B1 | 5/1976 | Germany. |
| 3710518C1 | 7/1988 | Germany. |
| 4029930A1 | 3/1992 | Germany. |
| 4105757A1 | 9/1992 | Germany. |
| 4344177C1 | 2/1995 | Germany. |
| 2271108A | 11/1990 | Japan. |
| 1490670 | 11/1977 | United Kingdom. |

OTHER PUBLICATIONS

English language abstract of JP 22-71108A, Nov. 1990.

*Primary Examiner*—Randolph A. Reese
*Assistant Examiner*—Eileen A. Dunn
*Attorney, Agent, or Firm*—Harness, Dickey & Pierce, P.L.C.

[57] ABSTRACT

A universal joint for small articulation angles, especially, an intermediate joint in a propeller shaft of motor vehicles, has an outer joint part (11) with longitudinally extending first ball tracks (14) which, between stop faces, include an axial length with an unchanged cross-section; an inner joint part (31, 51) with longitudinally extending second ball tracks (36, 56) whose axial length is greater than that of the first ball tracks (14); and torque transmitting balls (15) guided in the radially opposed first and second ball tracks (14, 36, 56). The outer joint part (11), at least in the axial region of the ball tracks (14) is produced as a formed plate metal part with an approximately constant wall thickness. The ball tracks (14), in the outer joint part (11), are formed by circumferentially distributed formations (13) axially closed at both ends by stops (16, 17).

13 Claims, 2 Drawing Sheets 5,795,233

1

UNIVERSAL JOINT

SUMMARY OF THE INVENTION

It is an object of the present invention to provide a universal joint of the initially mentioned type which can be more simply produced.

In the present invention, at least in the axial region of the ball tracks, the outer joint part is produced by a formed plate metal part. The part has an approximately constant wall thickness and the ball tracks in the outer joint part are formed by circumferentially distributed formations axially closed at both ends by integral stops. Such a shape simplifies the production of the outer joint part. The ball tracks and stops, which are produced integrally with the component, leads to a high degree of mechanical strength.

According to a preferred embodiment, at least in the axial region of the ball tracks, the outer joint part includes one piece and the ball tracks in the outer joint part are formed seamlessly from the material of a tubular member or circular blank. A joint component is produced simply by introducing a tubular member or circular blank into a suitable die. Expanding fingers, of an inner tool, press the axially limited ball tracks outwardly. However, a particularly advantageous and adapted production method may include introducing a tube into a die, with the tube sealingly closed at both ends and filled with a hydraulic pressure agent through a supply line, so that the track portions are produced in corresponding recesses in the die. In each case it is possible to produce seamless and accurately dimensioned ball tracks in the outer joint part.

According to a modified embodiment, in the region of the ball tracks, the outer joint part includes two longitudinal sections. Halves of the ball tracks, if viewed axially, are formed out of tube ends, respectively, with production taking place by mechanically deforming two circular blanks or tubular portions. This method is particularly advantageous in that the respective inner tools may be rigid and undercut-free. The two tube ends provided with the ball track halves may be connected by a suitable welding method, and if a suitable welding technology is chosen, there is no need for remachining the transverse seam in the region of the ball tracks.

According to a third embodiment, in the region of the ball tracks, the outer joint part is composed of two half-tubes. One half of the ball tracks, if viewed circumferentially, is formed out of one of the half-tubes, respectively. In this case, it is possible to use two planar plates or two half-round tubular shells to form the tracks as trough-shaped formations by applying a suitable forming technology, with the two half-tubes subsequently welded together to form a tube. As the connections are preferably provided between two tracks, the question of any projections at the welds is of subordinate significance. The tracks themselves can be produced seamlessly from the material. Apart from using mechanical means for forming purposes, which again have to have expandable elements, it is possible to consider explosion forming technologies or forming technologies involving the use of hydraulic pressure agents.

Preferred embodiments which have been selected to consistently further develop the chosen plate metal design include the outer joint part comprises an inserted cover. The cover closes the inner cross-section and if viewed from the shaft connection for the inner joint part, is positioned axially behind the ball tracks. The cover also forms an axial stop for the inner joint part to prevent axial pushing in of the inner joint part. The inserted cover includes at least partially internally spherical or internally conical guiding faces whose centers are positioned on the joint axis. If the joint is a fixed joint, the outer joint part comprises a further inserted cover. The cover partially closes the inner cross-section and comprises a central aperture for a shaft connection of the inner joint part. The cover, if viewed from the shaft connection for the inner joint part, is positioned axially in front of the ball tracks and forms an axial stop for the inner joint part to prevent axial extraction of the inner joint part. The further inserted plate metal cover includes at least partially internally spherical or internally conical guiding faces whose center is positioned on the joint axis.

The embodiment constituting a formed plate metal part with a substantially constant wall thickness as proposed in accordance with the invention for the outer joint part may, analogously, also be used for the inner joint part to the extent that the tracks, on the one hand, and the guiding faces opposite the outer joint part, on the other hand, are concerned. In this context, in a first preferred embodiment, at least in the axial region of the ball tracks, the inner joint part is produced in one piece. The ball tracks in the inner joint part are formed seamlessly out of the material of a tubular member or a circular blank. In this case, too, it is possible to carry out a forming operation against an outer tool by expanding means, but preferably by closing the tube ends and supplying a hydraulic pressure agent.

According to an alternative embodiment, in the region of the ball tracks, the inner joint part includes two semi-dishes. One half of each ball track, if viewed circumferentially, is fully formed in one of the half-dishes. Again, analogously to the above, the seamless track regions may be formed out of two plates or half-dishes, with the two half-dishes subsequently welded together to form an annular member.

Additional objects and advantages of the invention will be apparent from the detailed description of the preferred embodiment, the appended claims and the accompanying drawings, or may be learned by practice of the invention.

BRIEF DESCRIPTION OF THE DRAWINGS

Preferred embodiments of the invention will be explained below with reference to the drawings wherein.

DETAILED DESCRIPTION OF THE PREFERRED EMBODIMENT

Figure 1:
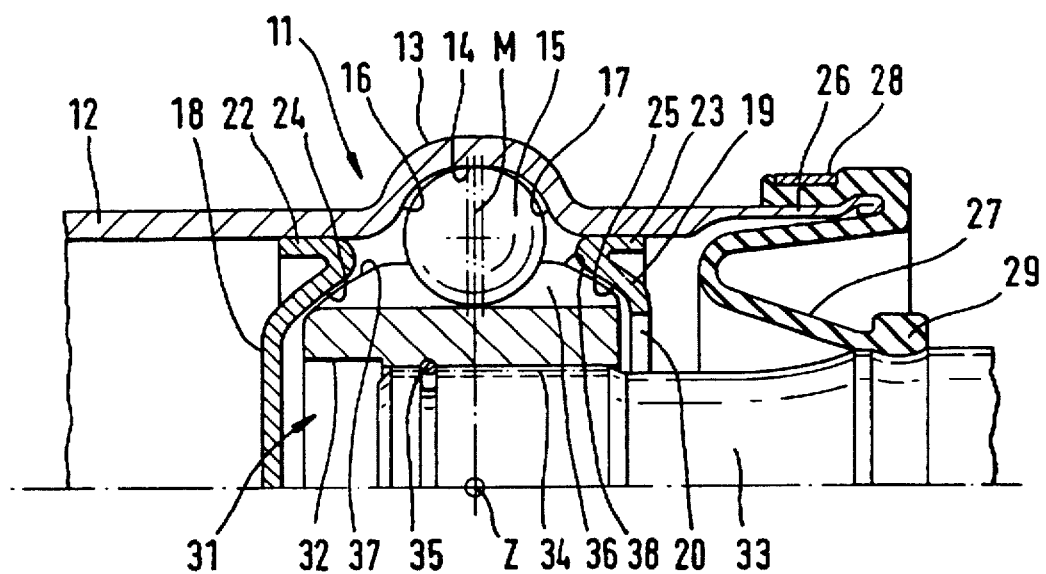
FIG. 1 is a cross-section view of a fixed joint with a solid inner joint part in accordance with the invention.

The Figures show a constant velocity universal joint for small articulation angles. The outer joint part 11 is produced in one piece out of a tubular member 12. Preferably, the outer joint part has a short length and is suitable to weld to a tubular shaft of the same diameter, or it may form itself a complete tubular shaft of a greater length. At a small distance from the illustrated end of the tubular member 12, circumferentially distributed, trough-like formations 13 are provided whose inner faces form ball tracks 14 in which balls 15 are axially movable between different planes M. The movement of the balls is limited by inner stops 16, 17 in the formations 13. At the free end of the tubular member 12 a thin-walled portion 26 is provided to which a rolling boot 27 is secured by means of a securing ring 28. The rolling boot 27 is also secured to a shaft part by means of an annular bead 29.

Figure 2:
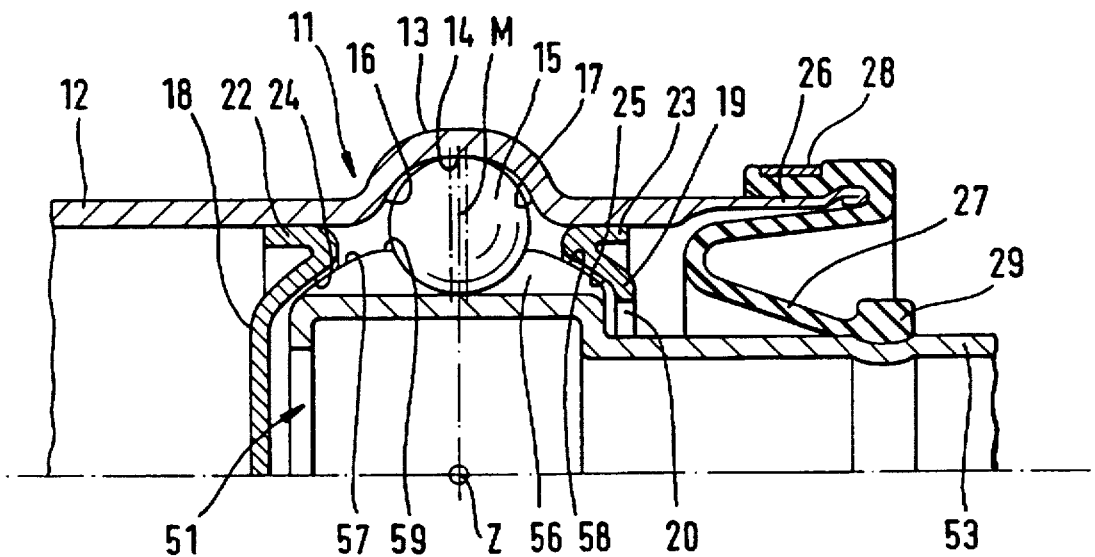
FIG. 2 is a view like FIG. 1 with a formed plate metal inner joint part.

In FIGS. 1 and 2, covers 18, 19 are inserted into the tubular member 12. The covers are formed plate metal parts with the cover 19 including a central through-aperture 20. Otherwise the covers are largely identical and arranged symmetrically relative to one another. At both ends, the covers are arranged at a distance from the ball tracks 14 in the outer joint part. The covers 18, 19 include outer beaded portions 22, 23 resting against the inner wall of the straight tubular member 12. The parts 12, 18, 19 are welded or soldered to one another. Furthermore, the covers 18, 19 include partially spherical or conical inner faces 24, 25 which form guiding faces for the inner joint part 31, 51.

Figure 3:
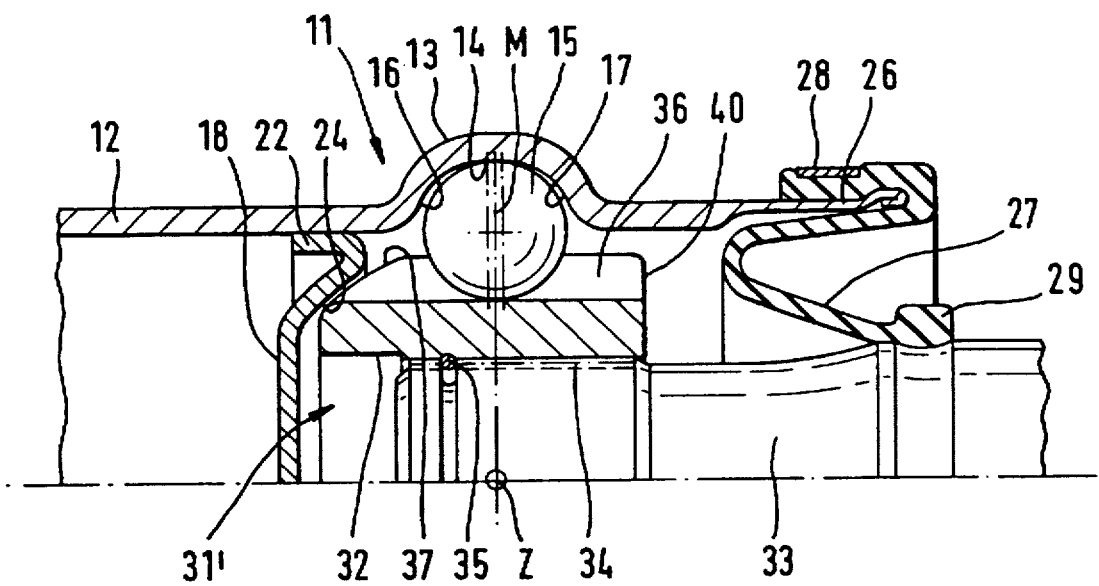
FIG. 3 is a cross-section view of a plunging joint in accordance with the invention.
Figure 4:
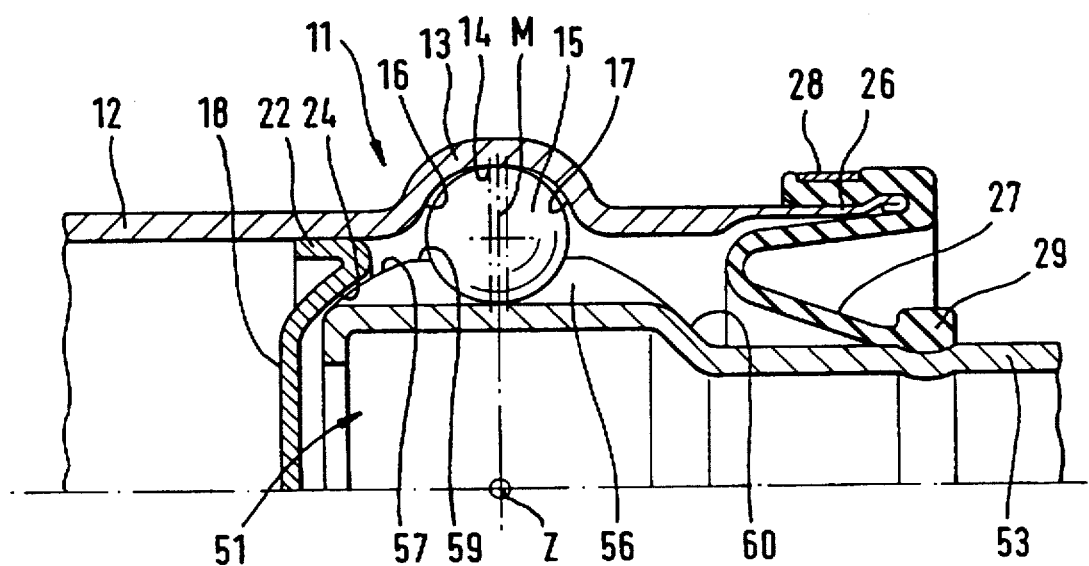
FIG. 4 is a view like FIG. 3 with a formed plate metal inner joint part.

FIGS. 3 and 4 only show the cover 18 in the above-described embodiment, but there is no part corresponding to the cover 19.

In FIGS. 1 and 3, the inner part 31, 31' is a solid formed part and includes an inner aperture 32 into which a shaft journal 33 is inserted. The journal 33, in FIG. 1, passes through the aperture 20 of cover 19. The connection between the outer joint part 31, 31' and the shaft journal 33 includes shaft teeth 34 and a securing ring 35. The inner joint part 31 is shown to have axial ball tracks 36 which enable a greater axial distance for the balls 15 than the tracks 14 in the outer joint part 11. Furthermore, in FIG. 1, the inner joint part 31, 31' includes externally spherical surface portions 37, 38 which, in a supporting and guiding way, cooperate with the internally spherical or conical surface 24, 25 of the cover 18 when the inner joint part is articulated around the joint center Z. In FIG. 3, only the surface portions 37 function in such a way. An axially opposed end face 40 of the inner joint part 31, 31' is contact-free relative to the outer joint part.

In FIGS. 2 and 4, the inner joint part 51 is integrally formed out of the end of the tubular member 53. The tubular member 53 may be welded to an adjoining tubular shaft of the same diameter or itself constitutes a complete tubular shaft. Formations 59 in the shape of longitudinal ribs, which form the track 56 in the inner joint part 51, are formed out of the material. Otherwise, the end portion of the tubular member 53 in FIG. 2 shows the same outer shape as the inner joint part according to FIG. 1. Again, externally spherical surfaces 57, 58 are shown which cooperate with the internally spherical or internally conical surfaces 24, 25 of the cover 18, 19. The surfaces 24, 25 provide axial support and guidance when the inner joint part is articulated around the joint center Z. In FIG. 4, only the surface portions 57 function in this way. A transition portion 60 of the inner joint part 51 is contact-free relative to the outer joint part.

While the above detailed description describes the preferred embodiment of the present invention, the invention is susceptible to modification, variation and alteration without deviating from the scope and fair meaning of the subjoined claims.

We claim:

1. A universal joint for small articulation angles, an outer joint part with longitudinally extending first ball tracks which, between stops, have an axial length with an unchanged cross-section;

an inner joint part with longitudinally extending second ball tracks whose axial length is greater than that of the first ball tracks;

torque transmitting balls guided in radially opposed first and second ball tracks; and at least in the axial region of the first ball tracks, the outer joint part is made of plate metal with an approximately constant wall thickness, the first ball tracks in the outer joint part are formed by circumferentially distributed formations axially closed at both ends by stops.

2. A joint according to claim 1, wherein at least in the axial region of the first ball tracks, the outer joint part is one piece including the ball tracks and the outer joint part ultimately seamless.

3. A joint according to claim 1, wherein in the region of the ball tracks, the outer joint part includes two longitudinal sections, and halves of the ball tracks, axially regarded, are formed out of one of two circular blanks and tubular portions respectively.

4. A joint according to claim 1, wherein the region of the first ball tracks, the outer joint part includes two half-tubes and one half of the ball tracks, circumferentially regarded, is fully formed out of one of the respective half-tubes.

5. A joint according to claim 1, wherein the outer joint part includes a first inserted cover which closes an inner cross-section of the outer joint part and which, if viewed from an end open for a shaft to be connected to the inner joint part, is positioned axially behind the ball tracks and forms an axial stop for the inner joint part to prohibit axial pushing in of the inner joint part.

6. A joint according to claim 5, wherein the first inserted cover for guiding the inner joint part, upon articulation around a fulcrum positioned on the axis of the outer joint part, is at least partially internally spherical, with center of curvature being positioned on the axis of the outer joint part.

7. A joint according to claim 5, wherein for the purpose of guiding the inner joint part around a fulcrum positioned on the axis of the outer joint part, the first inserted cover comprises an annular conical contact face whose center is positioned on the axis of the outer joint part.

8. A joint according to claim 5, wherein the outer joint part includes a second inserted cover which partially closes an inner cross-section and has a central aperture for a shaft to be connected to the inner joint part and which, if viewed from an end open for the shaft to be connected to the inner joint part, is positioned axially in front of the ball tracks and forms an axial stop for the inner joint part to prohibit axial extraction of the inner joint part.

9. A joint according to claim 8, wherein for the purpose of guiding the inner joint part around a fulcrum positioned on the axis of the outer joint part, the second inserted cover comprises an annular conical contact face whose center is positioned on the axis of the outer joint part.

10. A joint according to claim 8, wherein the second inserted cover for guiding the inner joint part upon articulation around a fulcrum positioned on the axis of the outer joint part, is at least partially internally spherical, with the center of curvature being positioned on the axis of the outer joint part.

11. A joint according to claim 1, wherein the outer joint part is formed out of a tubular member, which is firmly connectable to a driveshaft.

12. A joint according to claim 11, wherein at least in the axial region of the ball tracks, the inner joint part is produced in one piece including the ball tracks and the inner joint part ultimately seamless.

13. A joint according to claim 1, wherein at least in the axial region of the ball tracks, the inner joint part is produced as a formed plate metal part with an approximately constant wall thickness, and the ball tracks in the inner joint part are formed by circumferentially distributed formations which are axially open at both ends.

* * * * *

UNITED STATES PATENT AND TRADEMARK OFFICE
CERTIFICATE OF CORRECTION

PATENT NO. : 5,795,233
DATED : August 18, 1998
INVENTOR(S) : Markus Eschbach, Peter Schwärzler, Hans Heinrich Welschof It is certified that error appears in the above-identified patent and that said Letters Patent is hereby corrected as shown below:

Please insert at the top of Column 1 the following:

BACKGROUND OF THE INVENTION

The invention relates to universal joints with small articulation angles, especially intermediate joints in propeller shafts of motor vehicles. The universal joint includes an outer joint part with longitudinally extending first ball tracks, between stop faces. The ball tracks have an axial length with an unchanged cross-section. An inner joint part has longitudinally extending second ball tracks whose axial length is greater than that of the first ball tracks. Torque transmitting balls are guided in the radially opposed first and second ball tracks.

DE 37 10 518 C1 published July 28, 1988, illustrates universal joints for small articulation angles wherein the tracks in the outer joint part are provided in a solid component whose outside is circularly limited and whose wall thickness is great relative to the length of the tracks. The component including the tracks may be integrally produced with first axial stops for the balls and may be connected to an annular element which forms second axial stops for the balls. The component may optionally be limited to the length of the tracks to be assembled to form the complete outer joint part with two annular elements forming the one and the other of the axial stops for the balls.

The outer joint part component forming the tracks may, for example, either be stamped or extruded. Thus, the tracks are mechanically produced.

UNITED STATES PATENT AND TRADEMARK OFFICE
CERTIFICATE OF CORRECTION

PATENT NO. : 5,795,233
DATED : August 18, 1998
INVENTOR(S) : Markus Eschbach, Peter Schwärzler, Hans Heinrich Welschof It is certified that error appears in the above-identified patent and that said Letters Patent is hereby corrected as shown below:

(continued insert at the top of Column 1):

P 43 44 177.7 published February 16, 1995, describes a universal joint where the outer joint part is produced from formed plate metal parts. The first part contains the axial ball tracks and first stops for the balls and the second part has second stops for the balls. The two parts are clamped together by a holding element. The inner joint part is provided in the form of a solid formed part with mechanically produced ball tracks.

Column 3, line 57, Claim 1, after "angles," insert --comprising--

Column 4, line 6, Claim 2, after "ultimately" insert --being--

Column 4, line 11, Claim 3, before "tubular" insert --two--

Column 4, line 13, Claim 4, after "wherein" insert --in--

Column 4, line 59, Claim 12, after "ultimately" insert --being--

Signed and Sealed this

Fourth Day of July, 2000

Attest:

Q. TODD DICKINSON

*Attesting Officer*     *Director of Patents and Trademarks*